Figure 1:
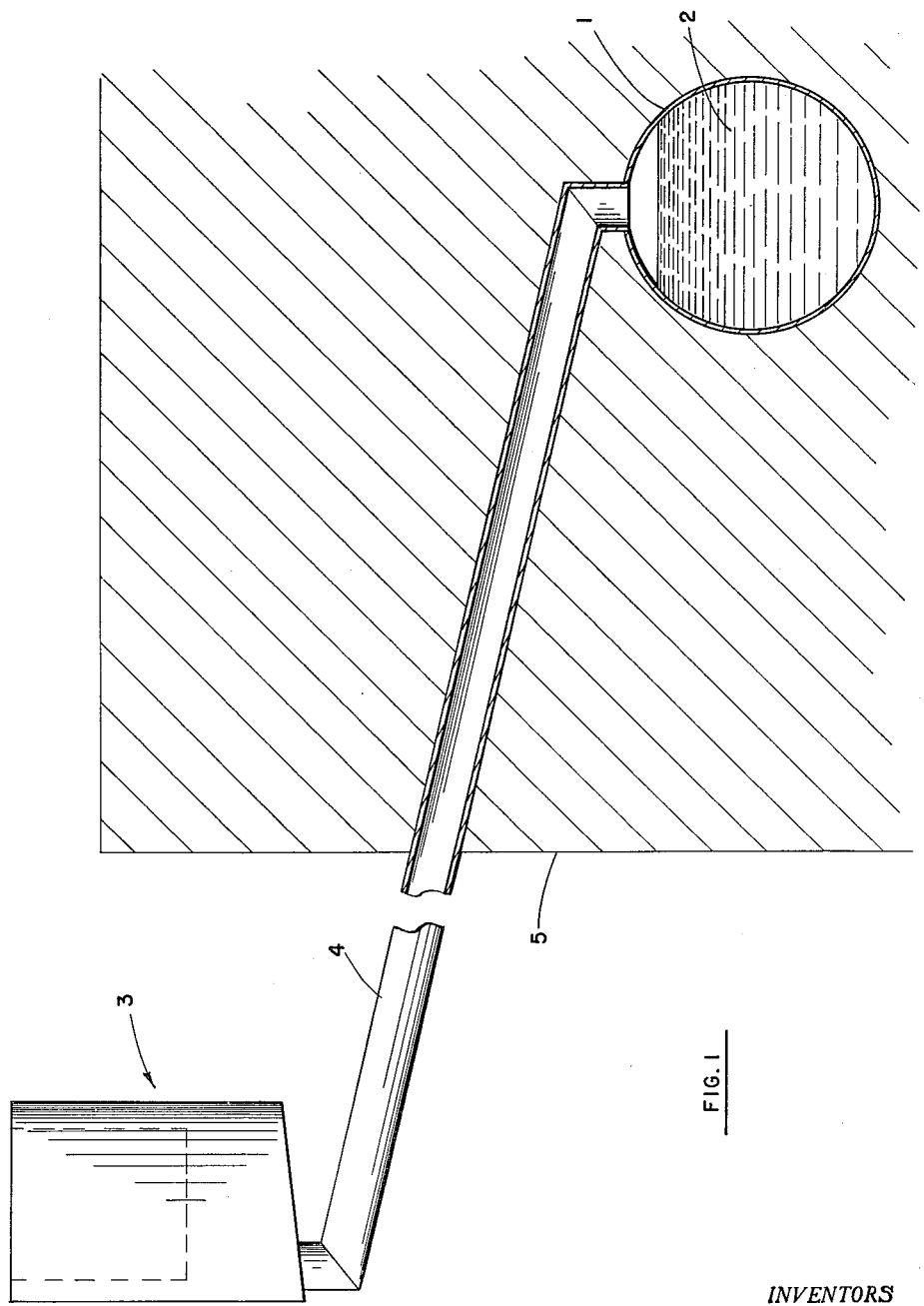

July 23, 1963  W. N. McELROY ET AL  3,098,810
VAPOR PRESSURE WATER BOILER REACTOR
Original Filed Aug. 20, 1956  3 Sheets-Sheet 1

*INVENTORS*
WILLIAM N. MC ELROY
GRANT O. HAROLDSEN
BY

*William R. Lane*
ATTORNEY

INVENTORS
WILLIAM N. MCELROY
GRANT O. HAROLDSEN
BY

William L. Lane
ATTORNEY

July 23, 1963

W. N. McELROY ET AL 3,098,810

VAPOR PRESSURE WATER BOILER REACTOR

Original Filed Aug. 20, 1956

3 Sheets-Sheet 3

INVENTORS
WILLIAM N. MC ELROY
GRANT O. HAROLDSEN

BY

William R. Lane
ATTORNEY

United States Patent Office

3,098,810
Patented July 23, 1963

3,098,810
VAPOR PRESSURE WATER BOILER REACTOR
William Nordell McElroy, Canoga Park, and Grant O. Haroldsen, Woodland Hills, Calif., assignors to North American Aviation, Inc.
Original application Aug. 20, 1956, Ser. No. 605,081. Divided and this application July 1, 1960, Ser. No. 42,743
2 Claims. (Cl. 204—193.2)

Our invention relates to an improved method of operating a solution-type nuclear reactor, and more particularly to an improved method and apparatus for recombining radiolytic hydrogen and oxygen.

For information concerning the theory, construction and operation of nuclear reactors, reference is made to U.S. Patents 2,708,656 and 2,714,577 to Fermi et al.; Glasstone, "Principles of Nuclear Reactor Engineering" (D. Van Nostrand); "The reactor Handbook" (3 volumes), published by the U.S. Atomic Energy Commission; and to the "Proceedings of the International Conference on the Peaceful Uses of Atomic Energy," held in Geneva, Switzerland, August 1955, available for sale at the United Nations' Book Store, New York, New York. For specific information relating relating to the aqueous solution-type reactors known as "water boiler" types, reference is made to "Research Reactors," chapter 1, published by the U.S. Atomic Energy Commission.

In the operation of the water boiler reactor, water is radiolytically decomposed into hydrogen and oxygen gases. In fact, the name "water boiler" comes from the bubbling of the released gases rather than from boiling of solution water; the reactor actually operates at below the boiling point of water. The recombination of the released hydrogen and oxygen gases is vital to the operation of the reactor. If not recombined, serious results can occur, ranging from core-splitting hydrogen detonations to loss of necessary fluid for maintaining the chain reaction. At the very minimum, if the gases are not recombined, they must be withdrawn from the reactor and replaced with an equivalent amount of water, which creates a possible radiation hazard.

Hydrogen and oxygen can recombine by a number of different mechanisms. Hydrogen in oxygen at low concentrations can react catalytically without a flame. As soon as the hydrogen concentration reaches the flammable limit (approximately 4.65 volume percent at one atmosphere pressure and 291° K.), the heat given off in the reaction increases the temperature of the gas and maintains it at or above the ignition temperature, producing a flame. At higher hydrogen concentrations (above 15 to 18 volume percent), the reaction rate and flame propagation velocity increase to such an extent that explosions result. In general, when the concentration is further increased and conditions are right, a detonation is possible, the reaction taking place at such a high rate that severe supersonic shock waves are generated.

Two general types of recombining systems are known, namely, flame and catalytic. The flame recombiner works under the principle of burning the hydrogen to supply the needed energy for the recombination reaction, while catalytic recombining takes advantage, at a lower temperature without a flame, of certain catalysts such as copper and platinum. The gas recombination systems employed to date have been rather large, expensive, and cumbersome. An example of such a gas recombiner system is shown in the above-identified "Research Reactors" volume. Such elaborate systems have added considerably to the cost of the water boiler reactor and have, unfortunately, reduced the number of institutions capable of purchasing them. While the gas recombiner can be completely eliminated in the very low power water boiler (e.g., 0–10 watts) and the radiolytic gases and fission product gases collected in a bag for later disposal, this expedient is undesirable for the core solution must be replenished, and a possibly dangerous hydrogen-oxygen mixture must be stored. A simplified recombiner, preferably an internal one, for handling smaller gas evolution at lower flux levels would be highly influential in reducing the cost and increasing the availability of the very low power reactor.

Heretofore, water boiler reactors have been operated at essentially atmospheric pressure in an atmosphere of air or of a carrier gas such as oxygen or nitrogen. The carrier gas was employed to circulate radiolytic gases to a recombiner, to dilute the hydrogen, and to buffer any explosions. This, however, did not contribute significantly to improving the gas-handling problem since the frequency and the difficulty of maintenance on radioactivity components was increased because of the complexity of the system.

Another interesting aspect of the water boiler reactor is the control and safety features. Such reactors are generally reasonably easy to control, in considerable part due to the inherent negative temperature coefficient of reactivity. Briefly, this means that a flux increase brings a corresponding solution temperature increase whose effect is to decrease solution density. With a density decrease, the fissionable material molecules are spaced farther apart, causing a decrease in reactivity. As the solution cools, density increases and the cycle can be repeated or an equilibrium state reached. It is also found that the hydrogen and oxygen gas bubbles, which contribute to the separation of the fuel molecules, produce a negative bubble coefficient of reactivity. While this mechanism provides a self-regulating safety feature, it would be desirable to still further increase its effectiveness to guard against any sudden power transients.

An object of our invention, in view of the shortcomings of the prior art, is to provide an improved method of operating a solution-type reactor.

Another object is to provide an improved water boiler reactor.

Another object is to provide an improved method for recombining radiolytic oxygen and hydrogen.

Another object is to provide an improved method of operating a solution-type reactor wherein the frequency and severity of hydrogen explosions due to component malfunctions are greatly reduced.

Another object is to provide such a method which simplifies the apparatus needed for recombining the radiolytic gases in a conventional water boiler reactor.

Still another object is to provide an improved gas recombiner for a water boiler reactor.

Still another object is to provide a low power water boiler reactor with an internal catalytic recombiner.

Yet another object is to provide an improvement in the safety control of a solution-type reactor.

A further object is to enhance the effects of the negative temperature coefficient of reactivity of a solution-type reactor.

Other objects and advantages of our invention will become apparent to those conversant in the nuclear arts from the following detailed description, taken together with the accompanying drawings and the attached claims.

Figure 2:
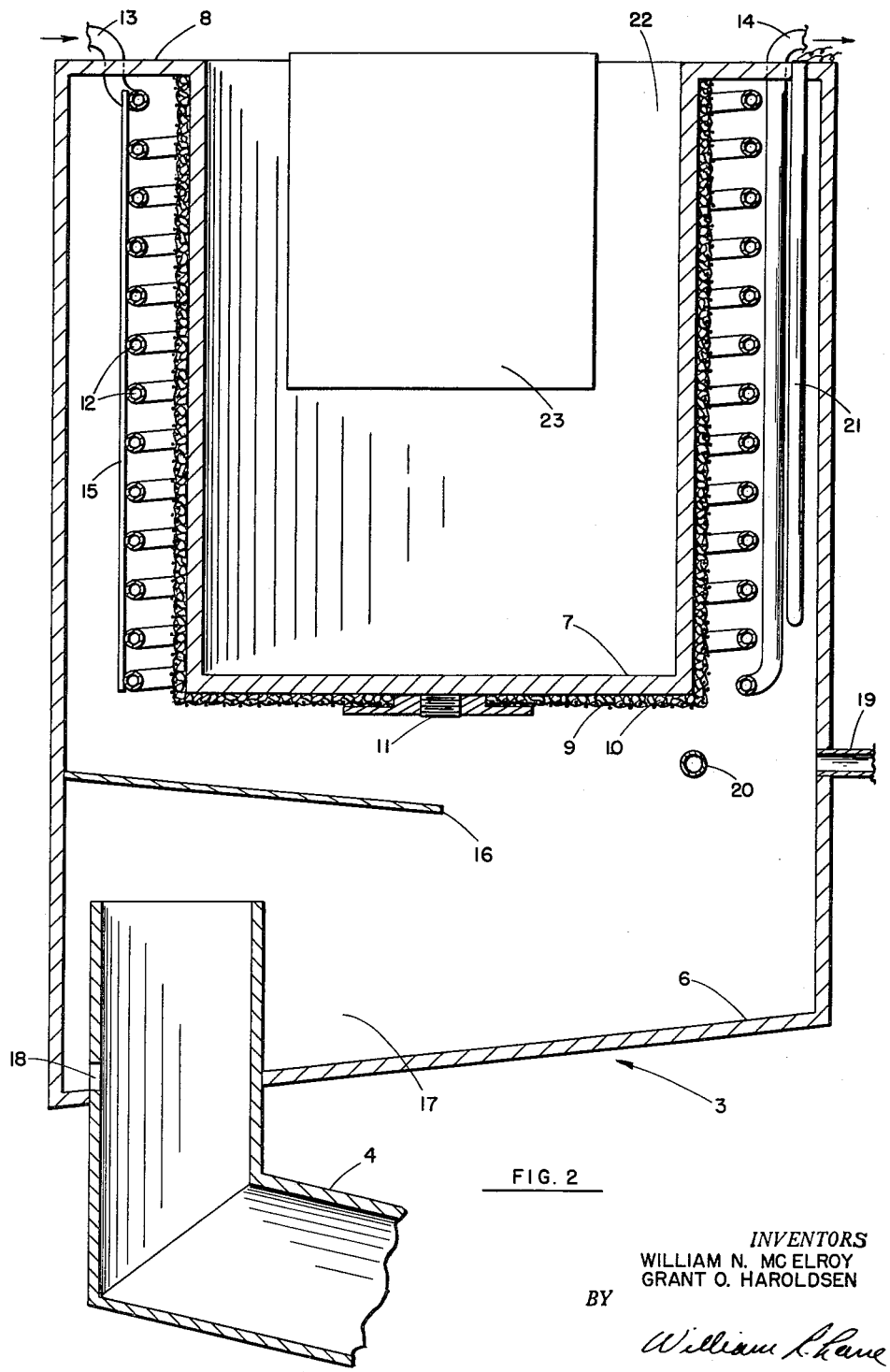
Figure 3:
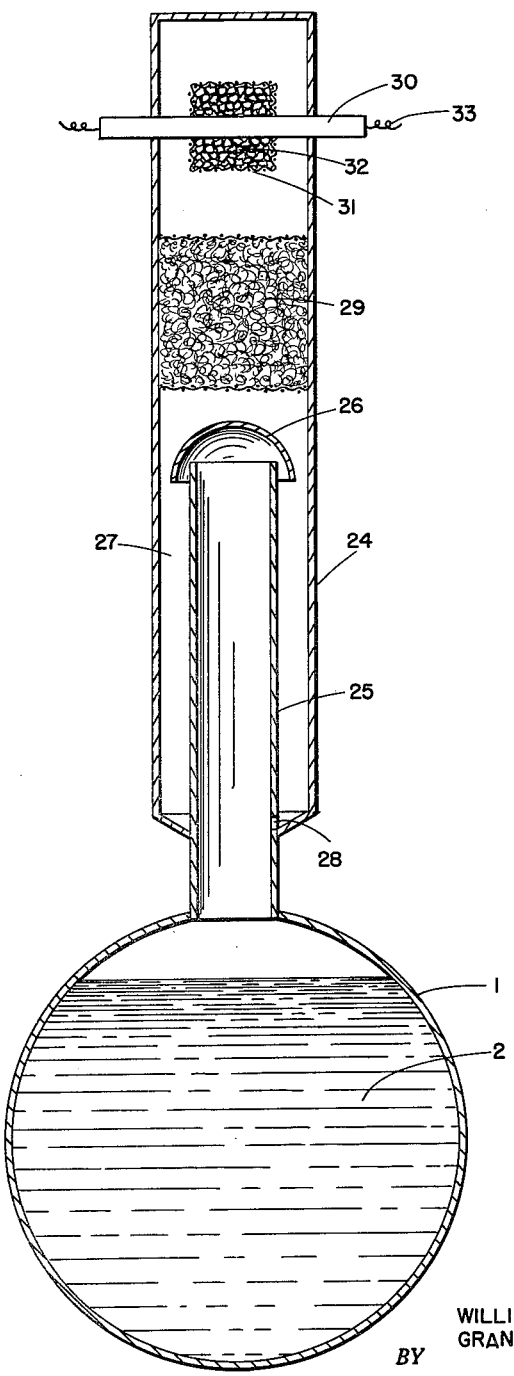

In the drawings:

FIGURE 1 is a cross-section partly in elevation of an improved water boiler reactor, FIGURE 2 is a detailed section of the recombiner of FIGURE 1, and FIGURE 3 is a section view of a low power water boiler reactor provided with an internal recombiner.

In accordance with our present invention, we have provided an improved method of operating an aqueous solution-type reactor which comprises maintaining the core of said reactor at a pressure substantially below atmospheric pressure during operation, catalytically recombining radiolytic hydrogen and oxygen during said operation, and returning the resulting recombined water to said core. Essentially, the pressure is equal to the sum of the vapor pressure of the core solution and of the partial pressure of the radiolytic gases; this pressure may be obtained by initially drawing a vacuum on the core and then permitting the pressure to be governed by the operating temperature of the core solution and the evolved radiolytic gases; and with efficient recombination the total pressure will be substantially equal to the solution vapor pressure. Our method of operation and the recombiner we have invented have proven so successful that they are being incorporated in newly-designed and more economical research reactors. At low power a relatively simple internal recombiner can be used, and at higher powers an improved closed-cycle external recombiner has been provided.

We find that such a method of operation greatly simplifies the operation of a solution-type reactor without the use of a carrier gas. Recombination may be accomplished relatively simply and hydrogen explosions greatly reduced in frequency and in severity for two principal reasons. One reason is the discovery that, at subatmospheric pressure, the initiation of an explosion is difficult and/or the explosion limit for hydrogen concentration may be manyfold greater than at atmospheric pressure. The other is that, at high core temperatures, the water-saturated atmosphere dilutes the hydrogen concentration and buffers against any explosions. These two features can work separately or in tandem to accomplish safe recombination. Thus, at lower pressures and temperatures there is less water vapor in the gas phase, but a much greater hydrogen concentration can be tolerated. As the temperature, and hence the pressure, increases, the permissible hydrogen concentration drops but an increased amount of water vapor helps to compensate for this. Furthermore, since the pressure above the solution is not much greater than the vapor pressure of the solution, the release of hydrogen and oxygen bubbles is greatly facilitated, contributing to the safety control of the reactor through the negative bubble coefficient effect. Also in this regard, the size of the bubbles is much greater than previously experienced, still further enhancing this effect.

The pressure above the solution will initially be equal to the vapor pressure of the solution and is generally a low grade vacuum. As radiolytic hydrogen and oxygen are released, the partial pressure of these gases will contribute to the total pressure. The amount of the contribution will vary with several factors including the temperature of the solution (at low temperatures the solution vapor pressure is low, e.g., 18 mm. Hg at 20° C.) and the efficiency of the recombiner. At high solution temperatures with our efficient recombiner, the total pressure should not be greatly above that of the solution vapor pressure. At low solution temperatures, and hence a lower solution vapor pressure, a greater contribution from the evolved hydrogen and oxygen to the total pressure can be expected. In any event, the total system pressure will generally be below about 600 mm. Hg or a temperature of approximately 90° C., and it is desirable that the pressure be governed substantially by the vapor pressure of the solution. Preferably, the core is maintained at a pressure at or below approximately 200 mm. mercury and at a temperature of approximately 20–30° C.

Referring now to FIGURES 1 and 2, our system comprises a water boiler reactor core 1, substantially full of core solution 2, of aqueous uranyl sulfate, and connected to recombiner 3 by line 4 through the reflector 5 (of graphite or beryllium). The recombiner assembly is housed in a hollow outer cylinder 6. A hollow inner cylinder 7 is supported by flange 8 on outer cylinder 6. A mesh screen 9 concentrically surrounds inner cylinder 7, the annulus therebetween being occupied by catalyst pellets 10 of platinized alumina. A solid plug 11 permits entry in the annulus for loading purposes. Cooling coils 12 concentrically surround mesh screen 9 and condense recombined water vapor to the liquid state. Tube 13 is the inlet line to cooling coils 12 and tube 14 is the outlet line. The cooling coils are supported by rods 15 which attach to flange 8. Deflector plate 16 deflects downward into spill-over chamber 17 any core overflow solution due to transients, thereby keeping the catalyst bed dry. The spill-over chamber 17 in effect replaces the regurgitator assembly of another water boiler type (see FIGURE 3, below). Drain return hole 18 slowly returns spill-over solution and recombined water to connecting line 4 back to core 1. A tube 19 connects to a pressure transducer which measures the pressure build-up in the recombiner, thereby providing a measure of the efficiency of the recombiner. (If the gases are not recombined, a marked pressure increase will result.) Line 20 is a lead to a valve and vacuum pump. Occasionally this line will be used to withdraw fission product gases which gradually build up in the recombiner and cause a slight increase in pressure. Tube 21 is provided for a thermocouple to measure temperature of the catalyst bed and well 22 may be used for heaters 23 to regulate the temperature of the catalyst. A corrosion-resistant metal or alloy should be used for the recombiner, stainless steel being the preferred construction material, except for the wire mesh screen, which is of Nichrome.

In operation of the recombiner, hydrogen, oxygen and water vapor from the reactor 1 pass into recombiner 3 through connecting line 4. The gases pass around deflector plate 16 and contact catalyst pellets 10 through screen 9 and are recombined. The reconstituted water vapor is condensed by coils 12 and the resulting liquid falls downward into spill-over chamber 17 and through drain holes 18 into connecting line 4 and thence to core 1.

A recombiner of the type shown in FIGURES 1 and 2 was employed at an equivalent reactor power (in a water boiler mock-up) of approximately 5.4 kv., using an electrolytic cell as the source of hydrogen and oxygen. The electrolytic cell solution (~20% NaOH) temperature never exceeded 22° C. which corresponds to a solution vapor pressure of 18 mm. Hg. The hydrogen and oxygen production rate was 0.069 mole/min. The catalyst consisted of approximately 18,000 pellets, ⅛″ diameter x ⅛″ long platinized alumina pellets (0.3% pt, 790 gms.). Table I, below, shows the satisfactory results. The small pressure build-up was due to non-stoichiometric operation of the electrolytic cell since a mass spectrographic analysis of a gas sample taken at 120 minutes showed only a trace concentration of hydrogen, indicating that all hydrogen produced had been recombined. The initial pressure rise is due to the need for an initial hydrogen concentration to be reached for efficient recombiner operation, as in all catalytic recombiners.

TABLE I

| Time (min.) | Press. ("Hg-vac.) | Press. (atm. abs) | External Catalyst wall temp. (° C.) | Recombiner gas temp. (° C.) |
|---|---|---|---|---|
| 0 | 28.88 | 0.037 | 420 | 83 |
| 3 | 26.13 | 0.130 | 422 | 85 |
| 6 | 25.33 | 0.155 | 427 | 89 |
| 9 | 24.95 | 0.170 | 430 | 91 |
| 13 | 24.61 | 0.180 | 429 | 95 |
| 18 | 24.37 | 0.187 | 423 | 98 |
| 23 | 23.97 | 0.200 | 429 | 99 |
| 28 | 23.60 | 0.214 | 428 | 101 |
| 33 | 23.18 | 0.227 | 436 | 104 |
| 38 | 22.90 | 0.237 | 411 | 104 |
| 43 | 22.57 | 0.247 | 421 | 105 |
| 50 | 22.02 | 0.265 | 410 | 105 |
| 57 | 21.61 | 0.280 | 397 | 102 |
| 1 60 | 21.40 | 0.286 | ------- | ------- |
| 62 | 22.32 | 0.256 | 397 | 99 |
| 68 | 22.83 | 0.238 | 401 | 97 |
| 84 | 23.12 | 0.229 | 399 | 88 |
| 94 | 23.14 | 0.228 | 399 | 87 |
| 111 | 23.24 | 0.225 | 423 | 89 |
| 120 | (2) | (2) | (2) | (2) |
| 123 | 23.27 | 0.223 | ------- | ------- |

1 Current turned off.
2 Sample taken for spectrographic analysis.

The principal nuclear parameters of the reactor of FIGURES 1 and 2, with cooling coils provided in the core, are shown in the following table.

TABLE II

| | |
|---|---|
| Power | 5 kw. maximum. |
| Neutron energy | Thermal. |
| Core diameter | 1 ft. (stainless steel). |
| Fuel solution | ~13 liters $UO_2SO_4$. |
| Amount of fuel | 850 grams uranium, ~90% enriched in U–235. |
| Excess reactivity | 0.5%. |
| Maximum thermal flux | $1.5 \times 10^{11}$ neutrons/sec./cm.$^2$. |
| Average thermal flux | $10^{11}$ neutrons/sec./cm.$^2$. |
| Reflector | Graphite right cylinder 5 ft. in diameter and 6 ft. high. |
| Shield | 3 ft. concrete. |
| Supplementary source in reflector | 0.2 curie Ra-Be. |
| Control rods (of boron carbide-aluminum) | (a) Coarse control rod, worth 1.05% in reactivity.<br>(b) Two safety rods, worth 2.22%.<br>(c) Fine control rod, worth 0.5%.<br>(d) Rack and gear drive. |
| Coolant (at 3 kw.) | (a) Coolant flow through core—3 g.p.m. $H_2O$.<br>(b) Coolant inlet temperature—40° F.<br>(c) Coolant outlet temperature—47° F.<br>(d) Average core solution temperature—85° F. |

FIGURE 3 represents an internal recombiner for a lower power (less than approximately 400 watts) water boiler reactor. The reactor comprises the core 1, core solution 2, and a regurgitator assembly 24 positioned above the core. The regurgitator is contained in a hollow cylindrical housing 24 and consists of a connecting line 25 from the core for passage of overflow core solution, a deflector plate 26, a cylindrical annulus 27 formed by container 24 and line 25 for the containment of overflow volume, and a drain hole 28 for the controlled return of core solution. Above the deflector plate 26 is an entrainment eliminator 29 of wire mesh, whose purpose is to remove entrained core solution. The recombiner comprises a tube 30 which is opened at its ends. The tube 30 passes through a wire mesh cylinder 31, housing a bed of platinized alumina pellets 32. Through tube 30 a resistance heating wire 33 passes to heat the catalyst if necessary. The recombiner is preferably of stainless steel.

As an example of the operation of the above type of internal recombiner, approximately 79.3 grams of platinized alumina pellets (approximately 1800 pellets, ⅛" in diameter x ⅛" long with a 0.3% Pt coating) were loaded into the recombiner, and a 120 watt heater passed through the inner tube. The recombiner assembly was installed in the regurgitator of a mock-up of a water boiler reactor, as shown in FIGURE 3, and a vacuum drawn on the system. Using an electrolytic cell with ~15% NaOH as the source of hydrogen and oxygen, the excellent data shown in Table III, below, was obtained.

TABLE III

*Experimental Data*

INTERNAL RECOMBINER

| Time of operation, hours | Equivalent reactor power, watts | System pressure | | Temperatures, ° C. | | | | | | | | | | Pellets |
|---|---|---|---|---|---|---|---|---|---|---|---|---|---|---|
| | | Inches Hg final (F) | Absolute initial (I) | Mock-up core soln. | | Ambient | | Center of catalyst | | Surface of containing screen | | Gas phase ½" from screen | | |
| | | | | F | I | F | I | F | I | F | I | F | I | |
| 4 | 8 | 3.2 | 1.0 | 19 | 19 | -- | -- | 23 | 21 | 23 | 22 | 21 | 19 | (1) |
| 8 | 8 | 3.5 | 1.3 | 19 | 19 | -- | -- | 25 | 21 | 24 | 21 | 22 | 19 | (1) |
| 8.7 | 15 | 3.3 | 1.3 | 20 | 19 | 23 | 21 | 25 | 21 | 25 | 21 | 23 | 19 | (1) |
| 32.5 | 11 | 1.7 | 1.5 | 19 | 19 | 25 | 20 | 26 | 21 | 26 | 21 | 22 | 18 | (2) |
| 1.5 | 205 | 1.8 | 0.7 | 21 | 18 | 23 | 18 | 36 | 22 | 34 | 22 | 27 | 17 | (2) |
| 10.5 | 400 | 6.7 | 1.4 | 41 | 20 | 23 | 22 | 75 | 24 | 52 | 24 | 52 | 20 | (2) |

1 Pellets wet.   2 Pellets appear dry.

In operation of the above unit at the 8 watt level without the catalyst heater over several periods of eight hours, the catalyst bed dried out. After the catalyst bed was dry, the recombiner was operated for a period of thirty-two hours. The absolute pressure within the system increased from 1.5" to only 1.7" mercury during this period of operation. The rate of $2H_2+O_2$ production at 11 watts was 1.54 liters (STP) per eight hours. The gas phase volume of this core and recombiner was 5.2 liters; consequently, in a thirty-two hour period, the pressure of the system would have increased by 36.0" mercury absolute if recombination had stopped. During this period, no explosions or detonations were observed. This is an excellent indication of the efficiency of the internal recombiner.

For further details concerning a reactor employing the internal recombiner of FIGURE 3, reference is made to the co-pending application of the common assignee, S.N. 607,929, filed September 4, 1956, now U.S. Patent No. 2,937,127, issued May 17, 1960, in the name of John M. Flora, for "Low Cost Nuclear Research Reactor."

The above examples of our invention are merely illustrative and should not be construed as limiting the scope of our invention. In particular, employing our basic principle of operating a solution-type reactor at essentially the vapor pressure of the solution, various modifications and alterations of the physical apparatus may be made, but these would still fall within the scope of our invention. Therefore, our invention should be limited only as is indicated by the appended claims.

Having thus described our invention, we claim:

1. A closed cycle water boiler reactor system comprising in combination a core vessel, a housing defining a chamber, duct means connecting said vessel to said housing and having one end extending into the bottom of said chamber for passing gases and liquids between said vessel and said chamber, said extended end of said duct and said housing defining a spillover volume at the bottom of said chamber, a deflector plate disposed above said duct end for deflecting core overflow solution into said spillover volume, means for catalytically recombining oxygen and hydrogen generated in said core and condensing said recombined gas, said last-named means being located above said deflector plate and communicating with said spillover volume, said deflector plate and said housing directing said liquid condensate into said spillover volume, and means connecting said spillover volume with the interior of said duct for controlling the return of liquids from said spillover volume to said core vessel.

2. A water boiler reactor system comprising in combination a core vessel containing a fuel solution, a housing defining a chamber, duct means connecting said vessel to said housing and having one end extending upwardly into said chamber for the passage of gases and liquids between said vessel and said chamber, said extending end of said duct means and said housing defining a spillover volume at the bottom of said chamber and surrounding said duct means extension (plate means above said duct means for deflecting fuel solution expelled from said core vessel through said duct means into said spillover volume, means for catalytically recombining and condensing gases in said housing located above said deflecting means and communicating with said spillover volume, and means in said duct means for slowly passing said condensate and solution from said spillover volume into said duct means at a point remote from said duct end.

References Cited in the file of this patent
UNITED STATES PATENTS 2,879,146     McElroy et al.     Mar. 24, 1959

OTHER REFERENCES

Atomic Energy Commission Document: AECD-3287, The Los Alamos Homogeneous Reactor, Supo Model, LDP. King, written October 1951, issued Feb. 7, 1952, p. 12.